M. O. BECKNER.
SILO.
APPLICATION FILED JUNE 9, 1917.

1,280,372. Patented Oct. 1, 1918.

WITNESSES
L. B. James

INVENTOR
Matthew O. Beckner
BY
ATTORNEY

UNITED STATES PATENT OFFICE.

MATTHEW O. BECKNER, OF ROANOKE, VIRGINIA.

SILO.

1,280,372.                   Specification of Letters Patent.        Patented Oct. 1, 1918.

Application filed June 9, 1917.   Serial No. 173,811.

*To all whom it may concern:*

Be it known that I, MATTHEW O. BECKNER, a citizen of the United States, residing at Roanoke, in the county of Roanoke and State of Virginia, have invented certain new and useful Improvements in Silos, of which the following is a specification.

This invention has relation to silos, and has for an object to provide a silo constructed to permit the withdrawal of its contents from the lower end thereof.

Another object of the invention is to provide means in a silo of this character to dislodge any desired quantity of ensilage from the lower portion thereof, said means including a cutting element adapted to cut or loosen the compact mass.

A still further object of the invention is to provide a cutting and dislodging means for the purpose set forth, including a rotatable element which forms a false bottom for the silo, adapted when rotated to dislodge predetermined quantities of ensilage from the mass, dependent upon the extent of rotation, whereby the dislodged ensilage may pass through the rotatable element and into a pit provided to receive the same.

In addition to the foregoing my invention comprehends improvements in the details of construction and arrangement of the parts to be hereinafter more fully described and particularly set forth in the appended claim.

In the accompanying drawings in which similar and corresponding parts are designated by the same characters of reference throughout the several views in which they appear:

Figure 1:
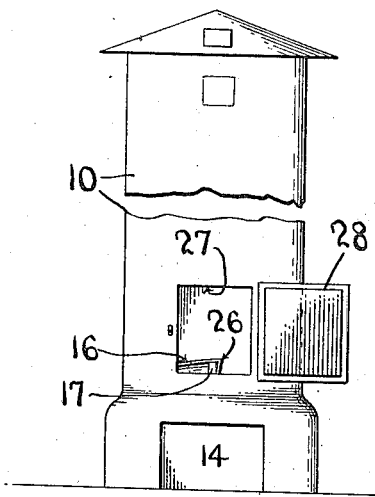
Figure 1, is a view in side elevation of a silo constructed in accordance with my invention.

With reference to the drawings, 10 indicates generally a silo of conventional type the wall of which is thickened at its lower portion as indicated at 11 to provide an inner annular ledge 12, located at any desired height above the floor 13 thereby forming a pit which should be sufficiently deep to provide head room whereby a person may stand upright therein. In the type of silo illustrated in the accompanying drawings the floor is coincident with the level of the ground, however if desired the pit may be sunk below the surface of the ground and access to the pit provided by means of an inclined runway. In any event an opening 14 is provided in the thickened wall of the silo to permit ingress and egress.

A framework is constructed in the pit which may comprise beams 15 of structural iron arranged in radial formation with their adjacent ends connected together centrally of the silo, and their remote ends embedded in the thickened wall of the silo. A rotatable element indicated generally at 16 is provided, and is utilizable both as a false bottom for the silo and as a means to loosen the lower portion of the compact mass of ensilage. To this end the rotatable element is located in the upper end of the pit and comprises a plurality of radial arms 17, connected together at their inner ends in any suitable fashion, the arms being of a length sufficient to extend from the center of the silo to the inner surface of the thinner wall of the silo, with the remote ends of the arms spaced above the aforesaid ledge 12. The outer extremities of alternate arms, or each arm as desired, are or is provided with anti-friction rollers 18 which are designed to rest upon an annular track 19 supported upon the ledge. The center portion of the rotatable element is supported upon the center portion of the frame formed by the beams 15 through the medium of an anti-friction bearing which comprises a circular casting 20 secured to the under side of the rotatable element, and a complemental circular casting 21 mounted upon the frame, the closely spaced faces of the casting being formed with annular race-ways to receive ball-bearings 22. The upper casting 20 may be formed with a central recess and the lower casting with a vertically projecting stud 23 to enter the recess whereby the castings will be mutually centralized and rotation of the rotatable element in a predetermined circular path insured.

Figure 2:
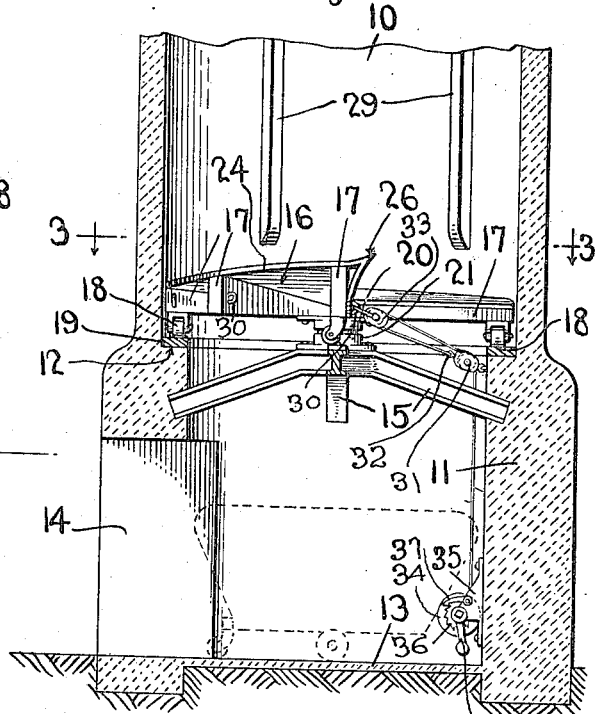
Fig. 2, is a view in vertical section of the lower portion of my improved silo.
Figure 4:
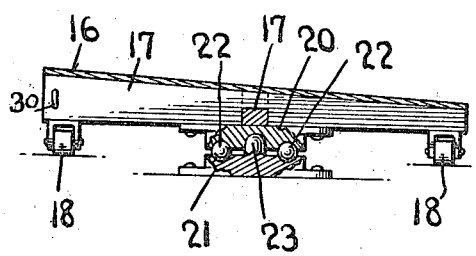
Fig. 4, is a detail view in section of the rotatable cutting element.
Figure 3:
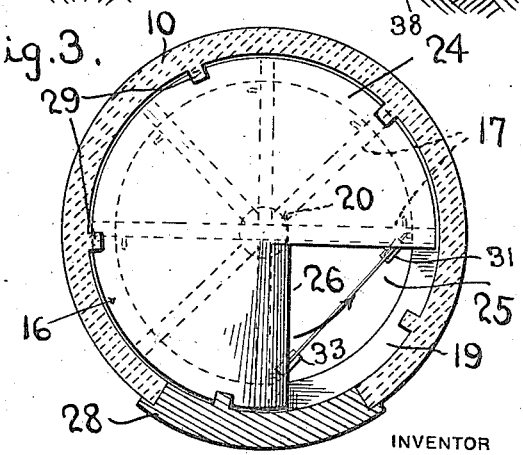
Fig. 3, is a horizontal section taken on the line 3—3 of the preceding figure.

Mounted upon the radial arms 17 of the rotatable element is a metallic disk 24 which is cut away for approximately one quarter its circumference to form a quadrant shaped opening 25 having radial edges. The material of the disk along one radial edge is preferably bent downward against the side of one of the arms 17, the corner of the bent portion being subsequently slightly turned up and sharpened to form a cutting edge 26. The disk is then twisted so that its upper surface may define a portion of a helix as indicated in Fig. 2 of the drawings. In view of the spiral formation of the disk the upper edges of the arms 17 should be inclined from end to end in order that the disk when supported thereon may perform the function expected of it. The wall of the silo just above the rotatable element may be formed with a door opening 27 if desired, and which may be closed by means of a hingedly mounted door 28.

The ensilage is fed through the top of the silo in the usual manner, and the opening 25 in the rotatable element may be temporarily closed to prevent material from falling into the pit. The ensilage however, becomes closely packed as the silo is filled and by the time demand upon the contents thereof is made, the lower portion of the ensilage will be in the form of an almost solid mass. The quadrant shaped opening being uncovered it will be apparent that if the rotatable element is rotated by means of a crow bar, the cutting edge 26 will sever or dislodge the ensilage from the mass, permitting the ensilage to fall through the quadrant shaped opening into the pit below. If desired a wheel barrow or the like may be positioned in the pit to receive the ensilage as it falls. It has been my experience that in a silo of average diameter, movement of the rotatable element through one quarter of a revolution will be sufficient to dislodge ensilage sufficient to feed the stock on a farm of average size.

To prevent the mass of ensilage from rotating with the rotatable element I provide a plurality of vertical ribs 29 in circumferentially spaced relation upon the inner surface of the silo wall. The ribs may be of concrete and formed integrally with the silo, or if the silo is constructed of wood, strips of wood may be nailed to the silo wall to form the ribs.

If desired the rotary bottom may be conveniently rotated a partial revolution by means of a block and tackle, and to that end I provide an eye bolt 30 upon the extremity of each beam 17 at the sides thereof facing the direction of rotation of the bottom. A double block 31 is anchored in the wall of the pit adjacent the ledge 12, and a cable is secured at one end to said block as at 32 and then passed around a single block 33 which is to be hooked in one of the eye bolts 30. The cable is then again passed around the block 31, and its terminal wound around a drum 34 mounted in a bracket 35 which is firmly secured to the inner surface of the wall of the pit adjacent the bottom thereof. A ratchet 36 is mounted for rotation with the drum and is adapted to be engaged by a pawl 37 pivotally mounted on the bracket, whereby to prevent a reverse movement of the drum and to retain the cable under strain.

In use, one of the beams is located at an angular distance of one-quarter of a circle from the block 31, and the drum is rotated by means of a crank handle 38 until the rotary bottom has been moved through a distance of one-quarter of a revolution. If this amount of movement is not sufficient to dislodge the desired amount of ensilage, the block 33 is unhooked from its beam and reconnected to the next adjacent beam and the rotary bottom may be again rotated through a partial revolution.

While I have illustrated and described my invention with some degree of particularity, I realize that in practice various alterations thereover may be made and I therefore desire to reserve the right and privilege of changing the form of the details of construction or otherwise altering the arrangement of the correlative parts without departing from the spirit of the invention or the scope of the appended claim.

Having thus described my invention, what I claim as new and desire to secure by Letters Patent is:—

In a silo having an annular supporting ledge located at a point above its bottom, an annular supporting plate mounted on said ledge, a framework located within the silo formed of radial beams, having their outer ends resting on the walls of the silo, and their inner ends directed upwardly, a circular block mounted on said beam having an annular race-way, a central stud on the block, a rotatable platform, a block mounted centrally upon the under side thereof provided with an annular race-way and a central recess to receive the stud, anti-friction rollers mounted on the periphery of the supporting platform resting upon the plate, and a spiral plate mounted upon the platform having a quadrantal opening formed therein and one edge of the plate forming the opening sharpened for the purpose set forth.

In testimony whereof I affix my signature in presence of a witness.

MATTHEW O. BECKNER.

Witness:
    M. E. JONES.